US006774767B2

(12) United States Patent
Hooks et al.

(10) Patent No.: US 6,774,767 B2
(45) Date of Patent: *Aug. 10, 2004

(54) VISUAL MESSAGING SYSTEM FOR HIGH-SPEED NETWORKS

(75) Inventors: Kevin Hooks, McKinney, TX (US); Chuck Odom, Sugar Land, TX (US)

(73) Assignee: Symon Communications, Inc., Plano, TX (US)

( * ) Notice: Subject to any disclaimer, the term of this patent is extended or adjusted under 35 U.S.C. 154(b) by 251 days.

This patent is subject to a terminal disclaimer.

(21) Appl. No.: 09/930,560

(22) Filed: Aug. 15, 2001

(65) Prior Publication Data

US 2002/0075158 A1 Jun. 20, 2002

Related U.S. Application Data

(63) Continuation of application No. 09/247,370, filed on Feb. 10, 1999, now Pat. No. 6,294,982.

(51) Int. Cl.[7] ................................................. G03B 9/00
(52) U.S. Cl. .......................... 340/286.02; 340/286.01; 340/825.69; 340/825.72; 345/723
(58) Field of Search ....................... 340/286.02, 286.01, 340/825.69, 825.72; 345/328, 723, 327; 455/3.2–3.02, 4.1, 5.1, 6.3

(56) References Cited

U.S. PATENT DOCUMENTS

| | | |
|---|---|---|
| 4,825,201 A | 4/1989 | Watanabe et al. |
| 5,136,695 A | 8/1992 | Goldshlag et al. |
| 5,347,384 A | 9/1994 | McReynolds et al. |

(List continued on next page.)

OTHER PUBLICATIONS

Advance Micro Devices, Inc. *Am79C960 PCnet–ISA Technical Manual*, May 1992.

Daktronics, Inc. *Project Highlights*, 1996.

Am 79C960 PCnet–ISA Technical Manual; Advance Micro Devices, May 1992.

(List continued on next page.)

*Primary Examiner*—Julie Lieu
(74) *Attorney, Agent, or Firm*—Madan, Mossman & Sriram, P.C.

(57) ABSTRACT

The present invention provides a visual messaging device for use with a high speed network. The message data is communicated to the network by a remote device, such as a computer or server. The visual messaging device includes a network interface circuit that receives the message data from the network and arranges it in a memory unit in usable form (packets) for use by a processor at the high network speed. The processor includes a central processing unit (CPU) and is a multi-tasking device, which sequences the messages in real time for display by the display device according to programmed instructions stored or provided to the visual messaging device. A display driver activates and deactivates the visual elements, such as individual LEDs, according to the processor's instructions. The various elements of the visual messaging device communicate in real time over a common data bus. The network may be a local area network, wide area network or the internet. A first memory stores the available messages from the receiver in a selected format for use by said processor and a second memory stores programs or programmed instructions. A common data bus provides two-way communications means for the processor, memories, network interface and the display driver. The processor provides status reports of the messages to the remote unit at the network speed.

18 Claims, 2 Drawing Sheets

U.S. PATENT DOCUMENTS

| | | | |
|---|---|---|---|
| 5,469,534 A | 11/1995 | Brindle et al. | |
| 5,523,769 A | 6/1996 | Lauer et al. | |
| 5,530,844 A | 6/1996 | Phillips et al. | 395/500 |
| 5,654,748 A | 8/1997 | Matthews, III | 348/13 |
| 5,790,792 A | 8/1998 | Dudgeon et al. | |
| 5,796,376 A | 8/1998 | Banks | |
| 5,825,201 A | 10/1998 | Watanabe et al. | 340/717 |
| 5,884,202 A | 3/1999 | Arjomand | 701/29 |

OTHER PUBLICATIONS

Project Highlights, Bay Area Rapid Transit, "BART Passengers to be Informed by New Daktronics Signs", Daktronics, Inc., 1996 (SL 090401–3173).

Internet article entitled: "Internet Connectivity: Stacking the Odds in Your Favor"; Author: Jack G. Ganssle, Embedded-Systems Programming, Embedded.com, (http://www.embedded.com/98/9801fe.htm).

VISUAL MESSAGING SYSTEM FOR HIGH-SPEED NETWORKS

This application is a continuation of application Ser. No. 09/247,370 filed Feb. 10, 1999, now U.S. Pat. No. 6,294,982.

BACKGROUND OF THE INVENTION

1. Field of the Invention

This invention relates generally to electronic visual display systems and more particularly to a real time visual messaging device for displaying messages received via high speed networks from remote sources.

2. Description of Related Art

Visual messaging devices are commonly used to display visual messages in the form of words, letters and figures. Such devices include a display unit that usually includes a matrix of illuminating elements, such as light emitting diodes (LED's). Messages are communicated or transmitted from remote control devices such as computers or servers over high speed networks such as local area networks (LAN's), wide area networks, the internet and the like.

In a large number of applications, such as manufacturing facilities, entertainment and other areas, it is very desirable to display the visual messages substantially in real time. The commonly used remote units transmit messages in the form of digital data at relatively high data rate (large bandwidth), typically in excess of one (1) megabits per second. Message information when used at the transmitted rate, i.e., without reducing the bandwith, can allow the messages to be displayed substantially in real time and provide real time two-way interaction between the messaging device and the remote unit with respect to the status and other important display parameters. It can also greatly enhance the visual features such as animation, scrolling, etc.

The prior art visual messaging devices first substantially reduce the received data rate, usually to about 10K bauds/second. Such devices are inefficient in the use of the transmitted data, do not provide the substantially real-time display or real-time two way interaction between the visual display device and the remote unit and thus significantly reduces the effect of display features and also severely limits the information that is communicated back to the remote unit.

The present invention provides a display messaging system wherein the visual display messaging device displays the messages substantially in real-time and communicates or interfaces with the remote unit in real-time.

SUMMARY OF THE INVENTION

The present invention provides a visual messaging device for use with a high speed network. The message data is communicated to the network by a remote device, such as a computer or server. The visual messaging device includes a network interface circuit that receives the message data from the network and arranges it in a memory unit in a usable form (packets) for use by a processor at the high network speed. The processor includes a central processing unit (CPU) and is a multi-tasking device, which sequences the messages in real time for display by the display device according to programmed instructions stored or provided to the visual messaging device. A display driver activates and deactivates the visual elements, such as individual LEDs, according to the processor's instructions. The various elements of the visual messaging device communicate in real time over a common data bus. The network may be a local area network (LAN), wide area network (WAN) or the Internet.

A first memory stores the available messages from the receiver in a selected format for use by said processor and a second memory stores programs or programmed instructions.

A common data bus provides two-way communications link among the processor, memories, network interface and the display driver. The processor provides status reports of the messages to the remote unit at the network speed, i.e., in real time. Such status may include the (i) current message on the display; (ii) configuration of the message displayed by the display device; (iii) message to be displayed; and (iv) time sequence of messages.

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiments, taken in conjunction with the accompanying drawings, in which like elements have been given like numerals and wherein.

DETAILED DESCRIPTION OF THE PREFERRED EMBODIMENTS

Figure 1:
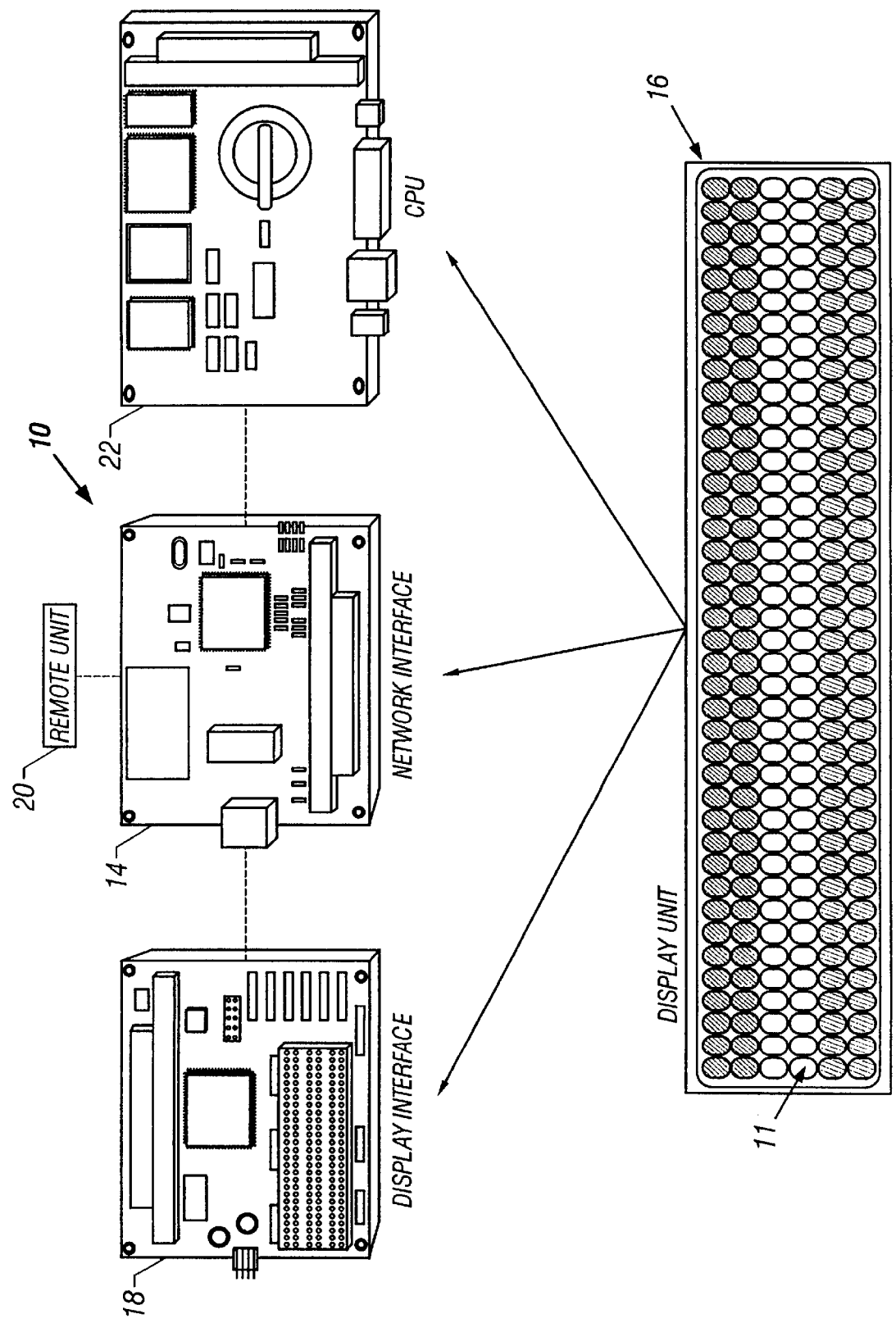
FIG. 1 shows certain hardware pieces that make up the visual messaging device of the present invention.

FIG. 1 illustrates generally the main hardware assemblies included in a visual messaging device 10 according to one embodiment of the present invention. The visual messaging device 10 is preferably an integrated unit comprising modular assemblies that include: one or more display units, such as a unit 16 containing a matrix of light emitting diodes 11 for displaying the visual messages in the desired format and sequence; a network interface 14 for interfacing with the high speed network and for providing the message data to the device at the high speed data rate; a display interface or driver 18 for driving or activating and deactivating the display unit 16; and a central processing unit 22 (also referred to herein as the processor or controller) for processing message data received from a remote unit 20 over the high speed network in real time and for controlling the operation of the various elements of the visual messaging device 10.

Figure 2:
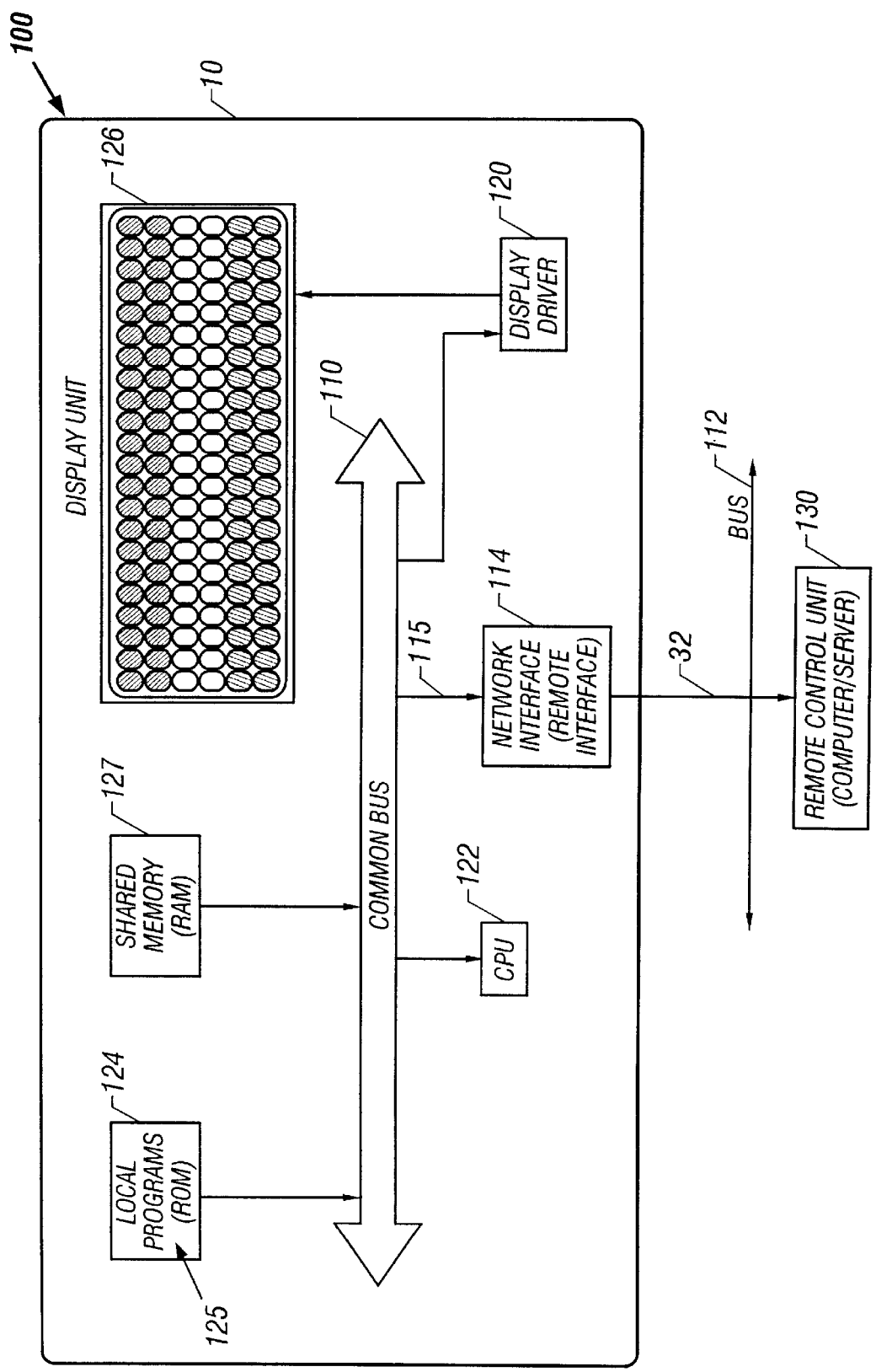
FIG. 2 is a functional block diagram of the visual messaging device of the present invention.

FIG. 2 shows a block functional diagram of a visual messaging display system 100 in more detail. The visual messaging display system 100 includes a visual messaging display device 10 and a remote unit 130, such as a computer or server suitable for two-way communication over a high speed network 112, such as a local area network (LAN), wide area network or the internet. The remote unit 130 provides to the high speed network 112 messages to be displayed and other information and control signals at high data rates, typically in excess of 1 megabits per second. This data rate however, in many cases, may be much greater than 1 megabits/second. In the system 100, the visual messaging device 10 includes a network interface circuit or unit 114, preferably in the form of a circuit board or a pluggable module. The network interface circuit 114 is operatively coupled to the network 112 via a line 32 and is adapted to provide two-way communication with the remote unit 130 over the network 112. The visual messaging device 10 further includes a central processor 122 (or processor), one or more memory units 124 for storing programs for the use of the central processor 122, a memory 127 for storing data for use by the processor 122, a display driver 120 that interfaces with the visual display 126. For the purpose of this invention, any suitable visual display device may be utilized, including a light emitting diode (LED) device, a liquid crystal device (LCD), an optical fiber display device, and a cathode ray tube (CRT). Such devices are commercially available. The display driver is configured or designed to operate the type of the display device selected for a particular application. In one embodiment, the visual display 126 preferably contains light emitting diodes (LEDs) of different colors arranged in a matrix, with each such LED adapted to be independently activated and deactivated by the display driver 120. The various elements of the messaging device 10 communicate with each other over a common bus 110, which is operatively coupled to each such device.

During operation, the remote unit 130 provides the necessary information about the messages to be displayed over the network 112 at a wide bandwidth (i.e., high data rate that generally exceeds 1 megabits/second). The network interface circuit or unit 114 receives this data and stores it in packets in a predetermined order in one bank of the shared memory 127. Shared memory units, such as memory 127, allow the central processor 122 to use and manipulate data stored in one segment of the memory 127 while allowing the network interface circuit 114 to store data in a second segment of the memory 127. The display driver 120 and the processor 122 can also look at the same data. The network interface circuit 114 preferably utilizes a single network chip set, such as ethernet chip AMD 79C961 made by AMD Corporation, or a similar device. However, any suitable real time network interface may be utilized for the purpose of this invention.

The programs 125 (also referred herein as the programmed instructions) for use by the central processor 122 are stored in the memory 124, which may be in the form of a read only memory (RaM). The programs 125 may be preloaded in the visual messaging device 10 and/or downloaded from the network 112. The stored programs may be altered by the processor 122 upon receiving instructions from the remote unit 130. The central processor 122 retrieves the stored data from the shared memory 127, manipulates that data according to one or more programs 125 stored in the memory 124 to build bit maps for use by the display driver 120 for activating and deactivating the LEDs of the visual display 126. The bit maps are stored in the shared memory 127.

The network interface circuit 114 makes available to the memory 127 the message data received from the remote unit 130 substantially in real time over the bus 110. The processor 122 executes multiple tasks with respect to the message data. It retrieves the bit packets, assembles messages (some messages taking more than one such packet), sequences the messages in order of the desired or selected priority and stores such messages in the shared memory 127. It also manages the execution of the messages by the display driver 120. For example, for a message that is desired to be scrolled on an LED type visual display 126, the processor 122 builds messages in the form that can be executed on such a display device, instructs the display driver 120 as to which particular LEDS are to be activated and deactivated and their respective timing.

The display driver 120 operates upon the instructions of the processor 122 and activates and deactivates the LEDs in the instructed order. This involves feeding to the display driver a variety of bit maps in real time. The speed at which the messages can be displayed and altered is limited by the display device speed. However, compared to the commercially available devices, the visual messaging display device 10 can display messages, such as letter, numbers, animations as close to the real time as the display device will allow. In the visual messaging display device 10, the network interface circuit stores the message data in the buffer in packets without reducing the bandwidth of the high speed network. The processor manipulates the received data and manages the display of the received messages on the display device. The processor 122 and the display driver 120 have access to the data to be displayed at the same time. The processor 122, memory 127, network interface unit 114 and the display driver 120 communicate over a common data bus 110. This combination allows the visual messaging display device 10 to deliver the message data to the visual display 126 at the high speed network bandwidth, which is many orders of magnitude (100 times or more) greater than the current products that use serial links between the network interface 114 and the display devices.

The processor communicates in real time various parameters or status reports of the messages to the remote unit 130 via the network interface 114 at the network data speed. The status reports may include the message on the display device, the configuration of the message displayed, next message, time sequence of messages, scrolling information and any other status information. The visual messaging device 10 preferably is an integrated device, in that, the network circuit, processor, display driver and the other elements described above form a single unit.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A messaging device for displaying messages in response to data constituting said messages transmitted by a remote system over a high speed network at a predetermined network data rate constituting a certain bandwidth of the network, said messaging device comprising:

(a) a visual display device having a plurality of discrete display elements;

(b) at least one memory in the visual display device;

(c) a network interface within said visual messaging device for receiving said data transmitted by the remote system and for storing such received data in packets in the at least one memory at said network data rate without reducing the bandwidth of the high speed network;

(d) a processor within said visual messaging device, said processor adapted to retrieve the data packets from the at least one memory, processing the retrieved data packets according to one or more programs associated with the at least one processor to build the messages for display on said visual display device, said processor further adapted for storing the built messages in the at least one memory in a select order in substantially real time;

(e) a display driver for retrieving said built messages from the at least one memory in said select order, said display driver in response to said built messages activating and deactivating said visual display device to display said messages; and (f) thereby enabling the visual messaging device to receive, process and display on the visual display device messages transmitted by the remote system substantially in real time.

2. The visual messaging device according to claim 1, wherein said processor determines a plurality of parameters relating to the messages and transmits said parameters to the remote system at substantially the network data rate.

3. The messaging device according to claim 1, wherein the processor builds the messages as bit maps for display.

4. The messaging device according to claim 1, wherein the high speed network is selected from a group consisting of (i) a local area network; (ii) a wide area network; and (iii) the Internet.

5. The messaging device according to claim 1, wherein the plurality of discrete display elements are selected from a group consisting of (i) light emitting diodes, (ii) a liquid crystal device; and (iii) a fiber display device.

6. The messaging device according to claim 1 further comprising one or more communication buses for providing communication among the processor, at least one memory, network interface and the display driver.

7. The messaging device according to claim 2, wherein said parameters are selected from a group consisting of (i) a message displayed by the visual display device; (ii) a configuration of the message displayed by the visual display device; (iii) a message to be displayed by the visual display device; and (iv) a time sequence of the messages.

8. The messaging device according to claim 1, wherein the visual display device, the network interface, the processor, and the memory form an integral unit.

9. A method of providing messages on a messaging device, said messages transmitted by a remote system over a high speed network at a predetermined network data rate constituting a certain bandwidth of the network, the method comprising:

(a) providing a visual display device for displaying visual messages transmitted by said remote system;

(b) providing at least one memory in at least one memory unit for storing messages transmitted by the remote system and messages processed by a processor;

(c) receiving said messages transmitted by the remote system and storing such received messages in data packets in the at least one memory at substantially the network data rate without reducing the bandwidth of the high speed network;

(d) retrieving and processing the data packets from the at least one memory according to one or more programs to build messages for display on said visual display device and storing the built messages in the at least one memory in a selected order at substantially the network data rate; and (e) retrieving the built messages from the at least one memory and in response thereto activating and deactivating the visual display device to display said built messages thereon in said select order, wherein said retrieving, processing, and display on the visual display device messages transmitted by the remote system are performed in real time.

10. The method of claim 9, wherein the visual display device includes a plurality of discrete display elements selected from a group consisting of (i) light emitting diodes; (ii) a liquid crystal device; and (iii) a fiber display device.

11. The method of claim 9 further comprising determining a plurality of parameters of the messages and communicating said parameters to said remote system over the high speed network.

12. The method of claim 11, wherein said high speed network is selected from a group consisting of (i) a local area network; (ii) a wide area network; and (iii) the Internet.

13. A messaging system for displaying messages data substantially in real time comprising:

(a) a remote unit transmitting messages over a high speed network at a selected network data rate;

(b) a visual messaging device coupled to the remote unit via a data communications medium;

(c) at least one memory in the visual display device;

(d) a network interface within said visual messaging device for receiving said data transmitted by the remote system and for storing such received data in packets in the at least one memory at said network data rate without reducing the bandwidth of the high speed network;

(e) a processor within said visual messaging device, said processor adapted to retrieve the data packets from the at least one memory, processing the retrieved data packets according to one or more programs associated with the processor to build the messages for display on said visual display device, said processor further adapted for storing the built messages in the at least one memory in a select order substantially in real time;

(f) a display driver for retrieving said built messages from the at least one memory in said select order, said display driver in response to said built messages activating and deactivating said visual display device to display said messages; and (g) thereby enabling the visual messaging device to receive, process and display on the visual display device messages transmitted by the remote system substantially in real time.

14. The messaging system according to claim 13, wherein the remote unit is a computer and the data communications medium is a local area network.

15. The messaging system according to claim 13, wherein the processor provides a plurality of status reports about the messages to said remote unit over said data communication medium substantially at the selected network data rate.

16. The messaging system according to claim 13, wherein said selected data rate exceeds 1 megabit per second.

17. The messaging system according to claim 13, wherein a display rate of the visual display device substantially determines the rate of display of messages on said visual display device.

18. The messaging system according to claim 13, wherein the visual display device includes a plurality of discrete elements selected from a group consisting of (i) light emitting diodes; (ii) a liquid crystal device, and (iii) a fiber display device.

* * * * *